United States Patent
Yuan

(10) Patent No.: US 11,190,503 B2
(45) Date of Patent: Nov. 30, 2021

(54) RESOURCE PROCESSING METHOD, APPARATUS, AND SYSTEM, AND COMPUTER-READABLE MEDIUM

(71) Applicant: Tencent Technology (Shenzhen) Company Limited, Shenzhen (CN)

(72) Inventor: Zhe Yuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 139 days.

(21) Appl. No.: 16/803,443

(22) Filed: Feb. 27, 2020

(65) Prior Publication Data

US 2020/0195632 A1    Jun. 18, 2020

Related U.S. Application Data

(63) Continuation of application No. PCT/CN2018/104986, filed on Sep. 11, 2018.

(30) Foreign Application Priority Data

Sep. 30, 2017  (CN) .................. 201710914860.X

(51) Int. Cl.
*H04L 29/06* (2006.01)
*H04L 9/32* (2006.01)
*H04W 12/06* (2021.01)

(52) U.S. Cl.
CPC ........ *H04L 63/0815* (2013.01); *H04L 9/3247* (2013.01); *H04L 63/0428* (2013.01);
(Continued)

(58) Field of Classification Search
CPC ............. H04L 63/0815; H04L 63/0428; H04L 63/062; H04L 63/10; H04L 9/3247; H04W 12/06

See application file for complete search history.

(56) References Cited

U.S. PATENT DOCUMENTS 7,685,206 B1 *  3/2010  Mathew ................ H04L 63/105
                                                          707/785
2011/0137805 A1   6/2011  Brookbanks et al.
(Continued)

FOREIGN PATENT DOCUMENTS

CN       102255933 A     11/2011
CN       102369714 A      3/2012
(Continued)

OTHER PUBLICATIONS

Tencent Technology, ISRWO, PCT /CN2018/104986, dated Nov. 30, 2018, 5 pgs.

(Continued)

*Primary Examiner* — Vance M Little
(74) *Attorney, Agent, or Firm* — Morgan, Lewis & Bockius LLP

(57) ABSTRACT

Embodiments of this application provide a resource processing method, apparatus, and system, and a computer-readable medium. A background server performs identification according to a received resource processing indication, to determine a to-be-processed resource; the background server transmits a resource processing request to a second interface when the to-be-processed resource includes a resource provided by a second cloud service, and the second interface initiates, to an authentication server according to the resource processing request, an authentication request used for accessing the resource provided by the second cloud service; the authentication server performs authentication on accessing the resource provided by the second cloud service, and returns an authentication success message to the second interface in a case that the authentication succeeds; the second interface transmits a resource processing indication to the background server in response to the (Continued)

authentication success message; and the background server then processes the to-be-processed resource accordingly.

15 Claims, 10 Drawing Sheets

(52) U.S. Cl.
CPC ............ *H04L 63/062* (2013.01); *H04L 63/10* (2013.01); *H04W 12/06* (2013.01)

(56) References Cited

U.S. PATENT DOCUMENTS

| | | | |
|---|---|---|---|
| 2014/0130142 A1* | 5/2014 | Plewnia | H04L 63/102 726/5 |
| 2015/0373026 A1 | 12/2015 | Xu | |
| 2017/0109302 A1 | 4/2017 | Wang | |
| 2017/0279803 A1 | 9/2017 | Desai et al. | |
| 2018/0288026 A1* | 10/2018 | Callaghan | H04L 9/3226 |
| 2020/0007541 A1* | 1/2020 | Appiah | H04L 63/0884 |

FOREIGN PATENT DOCUMENTS

| | | | |
|---|---|---|---|
| CN | 103019837 | A | 4/2013 |
| CN | 104052775 | A | 9/2014 |
| CN | 104969227 | A | 10/2015 |
| CN | 105989190 | A | 10/2016 |
| CN | 106559453 | A | 4/2017 |
| CN | 106657152 | A | 5/2017 |
| CN | 106933648 | A | 7/2017 |
| CN | 107070863 | A | 8/2017 |
| JP | 2007065869 | A | 3/2007 |
| JP | 2008217366 | A | 9/2008 |
| JP | 2010128719 | A | 6/2010 |
| JP | 2013250612 | A | 12/2013 |
| JP | 2016173861 | A | 9/2016 |
| JP | 2017079419 | A | 4/2017 |
| KR | 20170019822 | A | 2/2017 |

OTHER PUBLICATIONS

Tencent Technology, IPRP, PCT /CN2018/104986, dated Mar. 31, 2020, 4 pgs.

* cited by examiner

RESOURCE PROCESSING METHOD, APPARATUS, AND SYSTEM, AND COMPUTER-READABLE MEDIUM

CROSS-REFERENCE TO RELATED APPLICATIONS

This application is a continuation application of PCT/CN2018/104986, entitled "RESOURCE PROCESSING METHOD, APPARATUS, AND SYSTEM, AND COMPUTER-READABLE MEDIUM" filed on Sep. 11, 2018, which claims priority to Chinese Patent Application No. 201710914860.X, entitled "RESOURCE PROCESSING METHOD, APPARATUS, AND SYSTEM, AND COMPUTER-READABLE MEDIUM", filed with the China National Intellectual Property Administration on Sep. 30, 2017, all of which are incorporated by reference in their entirety.

FIELD OF THE TECHNOLOGY

This application relates to the field of Internet technologies, and in particular, to a resource processing method, apparatus, and system, and a computer-readable medium.

BACKGROUND OF THE DISCLOSURE

Currently, in rights management of a cloud service, a user side generally manages an access right of a resource provided by the cloud service by defining a corresponding authorization policy for a scenario that a client invokes a cloud interface. This rights management manner belongs to a pre-authorization manner, and is mainly used for resolving a problem of rights management performed by a cloud service provider on a user.

In the related art, a client may initiate, by using an interface, a processing request for a resource provided by a cloud service A, and if a user using the client succeeds in authentication, a background server may process the resource. However, if the background server needs to access, when processing the resource of the cloud service A, resources provided by another two cloud services, the client needs to continue to separately initiate two processing requests, and needs to separately perform authentication on the user twice. Only when all the times of authentication succeed, the background server is allowed to access the resources provided by another two cloud services. In this scenario, three sets of invocation logic need to be further correspondingly configured for a user side, and consequently design complexity and maintenance costs are both relatively high. In addition, all the three times of requests need to be initiated by the client on the user side, which reduces processing efficiency for the resources provided by the cloud services.

SUMMARY

In view of this, embodiments of this application provide a resource processing method, apparatus, and system, and a computer-readable medium, which reduces design complexity and maintenance costs to some extent, and improves processing efficiency for a resource provided by a cloud service.

According to one aspect, an embodiment of this application provides a resource processing method, applied to a computer system comprising an interface device, a background server and an authentication server; in the computer system, the interface device being configured with at least a first interface and a second interface, the first interface corresponding to a first cloud service, and the second interface corresponding to a second cloud service; and the method comprising:

obtaining, by the background server, a resource processing indication from the first interface;

performing, by the background server, identification according to the resource processing indication, to determine a to-be-processed resource;

transmitting, by the background server, a resource processing request to the second interface in a case that the to-be-processed resource comprises a resource provided by the second cloud service;

initiating, by the second interface according to the resource processing request, an authentication request to the authentication server for accessing the resource provided by the second cloud service;

performing, by the authentication server in response to the authentication request, authentication on accessing the resource provided by the second cloud service, and returning, by the authentication server an authentication success message to the second interface in a case that the authentication succeeds;

transmitting, by the second interface in response to the authentication success message, a resource processing indication to the background server; and processing, by the background server, the to-be-processed resource in response to the resource processing indication from the second interface.

An embodiment of this application further provides resource processing computer system, comprising an interface device, a background server and an authentication server, the interface device being configured with at least a first interface and a second interface, the first interface corresponding to a first cloud service, and the second interface corresponding to a second cloud service, each having one or more processors, memory coupled to the one or more processors and a plurality of programs stored in the memory that, when executed by the one or more processors, cause the resource processing computer system to perform the aforementioned resource processing method.

An embodiment of this application further provides a non-transitory computer readable storage medium storing a plurality of machine readable instructions in connection with a resource processing computer system, comprising an interface device, a background server and an authentication server, each having one or more processors, the interface device being configured with at least a first interface and a second interface, the first interface corresponding to a first cloud service, and the second interface corresponding to a second cloud service, when executed by the one or more processors, cause the resource processing computer system to perform the foregoing resource processing method.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To better understand the technical solutions of this application, the embodiments of this application are described below in detail with reference to the accompanying drawings.

For problems that, in the related art, in a procedure of processing a resource provided by a specified cloud service, in a case that a background server needs to access resources provided by other cloud services, a user side needs to separately initiate a resource processing request, and separately perform authentication, which leads to relatively high design complexity and maintenance costs, and relatively low processing efficiency, embodiments of this application provide a corresponding solving idea: in a procedure that the background server processes a resource provided by a first cloud service, in a case that a resource provided by a second cloud service needs to be accessed, the background server initiates a resource processing request to a second interface corresponding to the second cloud service, to trigger the second interface to initiate, to an authentication server, authentication on accessing, by the first cloud service, the resource provided by the second cloud service, and in a case that the authentication succeeds, the background server is triggered through the second interface corresponding to the second cloud service to perform resource processing.

Under the guidance of the idea, the embodiments of this application provide the following implementations.

Figure 1:
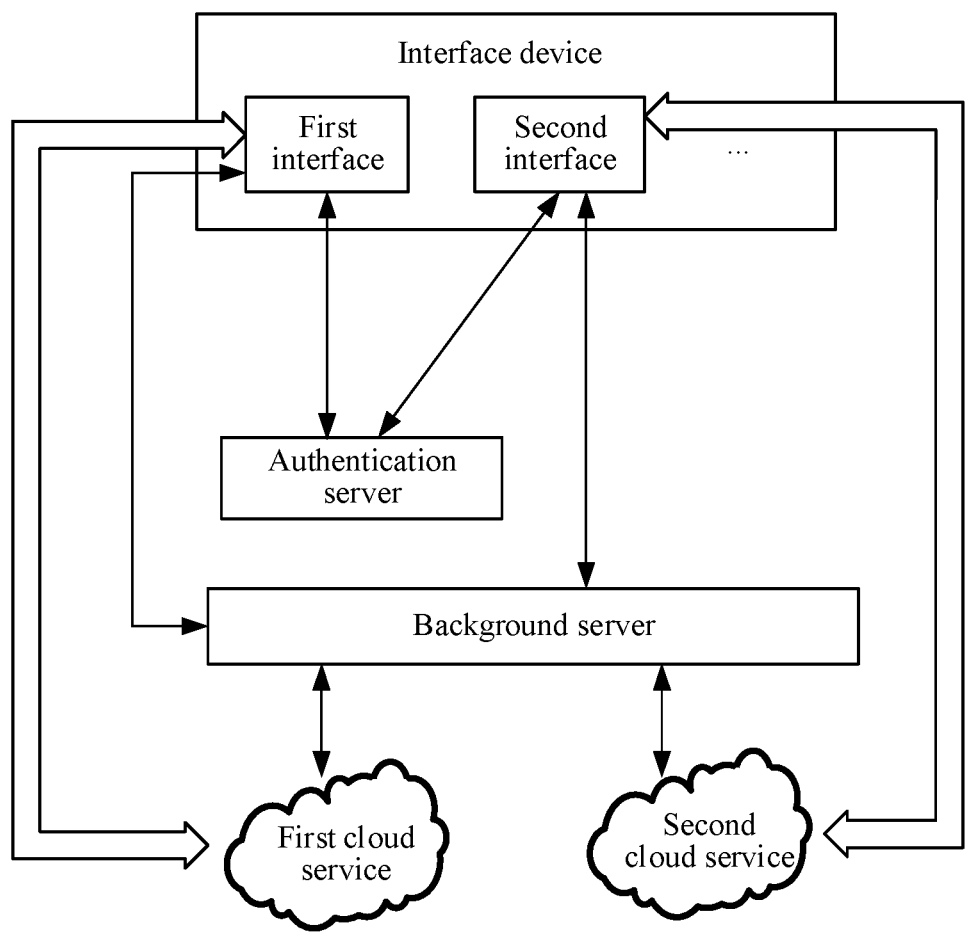
FIG. 1 is a schematic architecture diagram of a system to which technical solutions provided in embodiments of this application are applied.

FIG. 1 is a schematic architecture diagram of a system to which technical solutions provided in embodiments of this application are applied. As shown in FIG. 1, the system includes an interface device, a background server, an authentication server, and one or more cloud services.

As shown in FIG. 1, in the system, the interface device is at least configured with a first interface and a second interface. In FIG. 1, only the first interface and the second interface are used as an example, but are not intended to limit a quantity of interfaces included in the interface device. The first interface corresponds to a first cloud service, the second interface corresponds to a second cloud service, and each cloud service may include one or more corresponding interfaces. This is not particularly limited in the embodiments of this application. The interface corresponding to each cloud service is configured to process a resource processing request, initiated by a user side or the background server, for a resource provided by the cloud service. In a case that each interface processes the received resource processing request, the interfaces in the interface device, as an access layer and a process controller, are configured to be responsible for a processing process of the request and link operation procedures, and servers separately interact with the interfaces, to complete corresponding operations and processing. In a specific implementation, the interface related to this embodiment of this application may be a cloud application programming interface (API).

A cloud service is an addition, use, and delivery mode of a related service based on the Internet, and usually provides, by using the Internet, a dynamic and easily extended resource that is usually virtualized. In an implementation, the cloud service may be borne through a cloud server, and a cloud service provider publishes the cloud service through the cloud server. A resource provided by the cloud service belongs to a constituent part of the cloud service. For example, the resource provided by the cloud service may include, but is not limited to: a cloud virtual host, a content delivery network (CDN), a virtual private network, or the like. Only the resource provided by the cloud service is described by using an example herein, and is not intended to limit types and a quantity of resources provided by the cloud service.

The cloud service provider is mainly responsible for publishing a cloud service that can be provided by the cloud service provider through the cloud server, and a vendor is a user who registers with the cloud service provider and uses the resource provided by the cloud service, and is equivalent to a user of the resource provided by the cloud service. The cloud service provider may also be the vendor, that is, a user of another cloud service. Similarly, the vendor may also be the cloud service provider providing a cloud service to another user.

As shown in FIG. 1, the authentication server is configured to perform authentication in response to authentication requests transmitted by the interfaces, and return corresponding authentication results to the interfaces transmitting the authentication requests. The background server is configured to process the resource in response to a resource processing indication of the interface. In consideration of security and for ease of rights management, the resource provided by the cloud service is not directly operated and processed by a client, but is operated and processed by the background server instead. Therefore, the background server is an actual executor of resource processing, and is configured to operate and process the resource provided by the cloud service. For example, the operating the resource provided by the cloud service may be applying for a cloud virtual host, modifying a cloud virtual host, combining a plurality of cloud virtual hosts into a cluster, or the like. A person skilled in the art may understand that, it is only an example for description, and is not intended to limit resource types or operation types.

Figure 2:
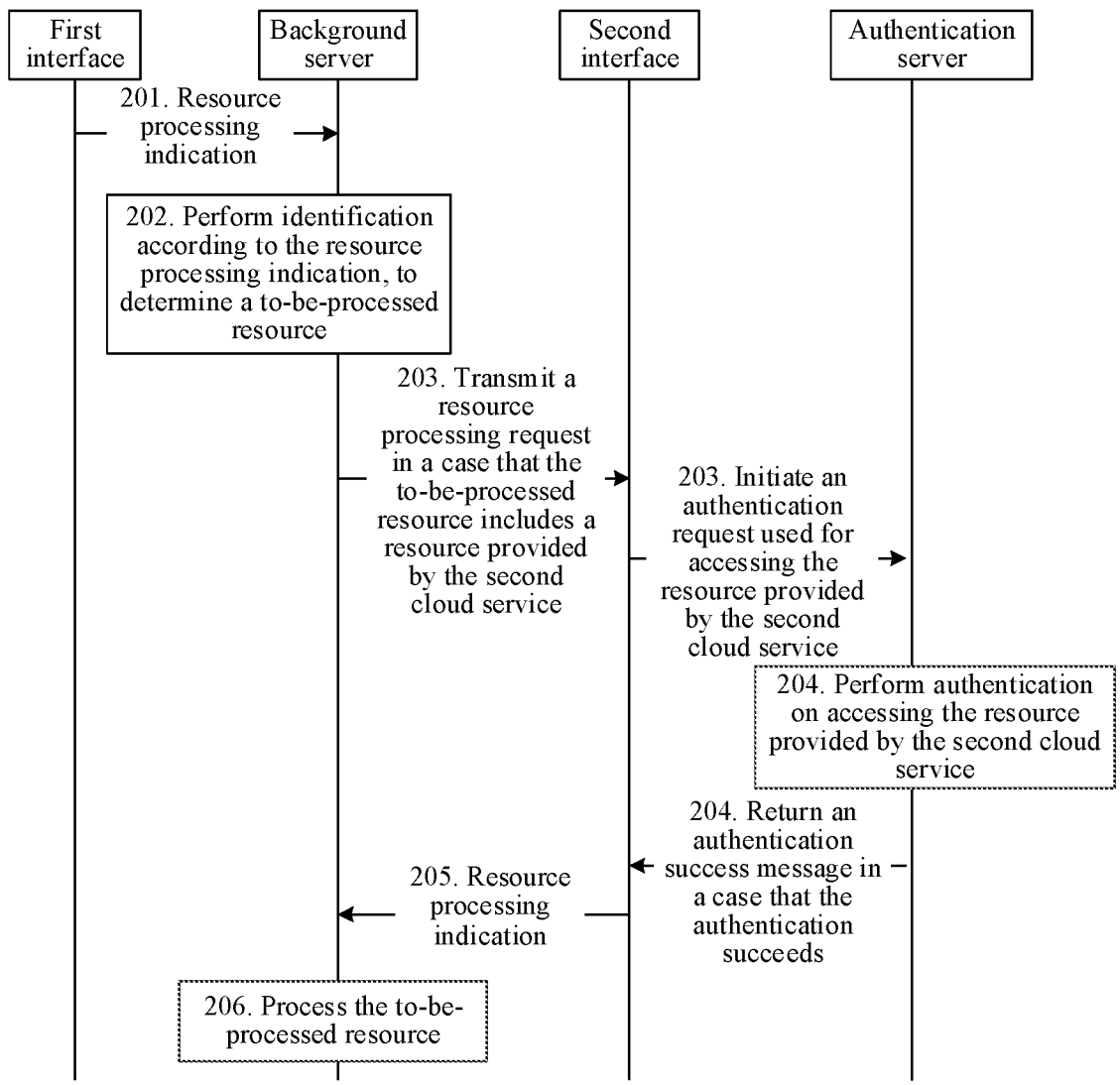
FIG. 2 is a schematic interaction flowchart of a resource processing method according to an embodiment of this application.

Based on the system shown in FIG. 1, an embodiment of this application provides a resource processing method. FIG. 2 is a schematic interaction flowchart of a resource processing method according to an embodiment of this application, and as shown in FIG. 2, the method includes the following operations:

201: The background server obtains a resource processing indication from the first interface.

202: The background server performs identification according to the resource processing indication, to determine a to-be-processed resource.

203: The background server transmits a resource processing request to the second interface in a case that the to-be-processed resource includes a resource provided by the second cloud service, and the second interface initiates, to the authentication server according to the resource processing request, an authentication request used for accessing the resource provided by the second cloud service.

204: The authentication server performs, in response to the authentication request, authentication on accessing the resource provided by the second cloud service, and returns an authentication success message to the second interface in a case that the authentication succeeds.

205: The second interface transmits, in response to the authentication success message, a resource processing indication to the background server.

206: The background server processes the to-be-processed resource in response to the resource processing indication from the second interface.

Figure 3:
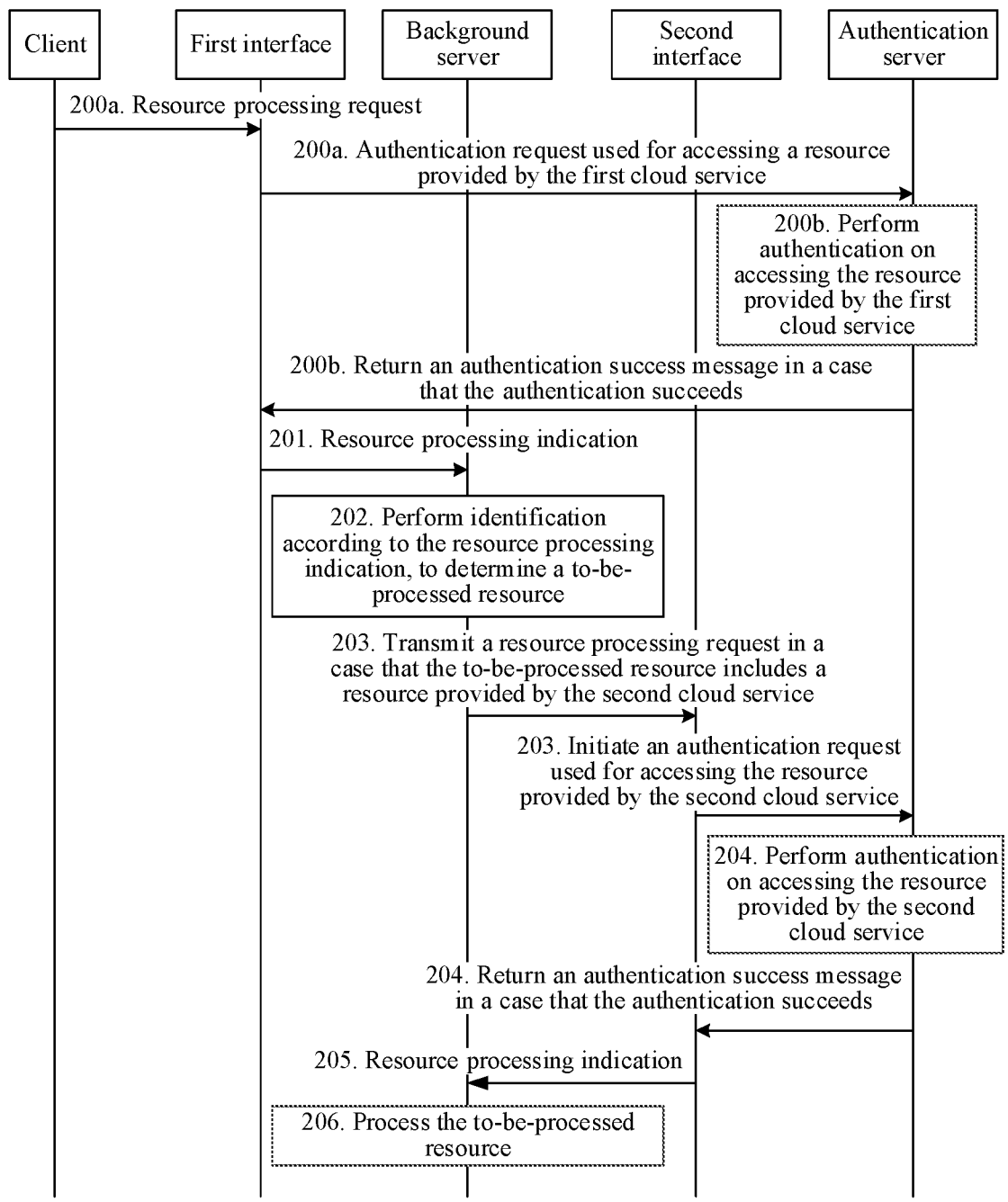
FIG. 3 is another schematic interaction flowchart of a resource processing method according to an embodiment of this application.

In an implementation, as shown in FIG. 3, before operation 201, the following operations may be further included:

200a: The first interface initiates, to the authentication server in response to a resource processing request transmitted by a client, an authentication request used for accessing a resource provided by the first cloud service.

200b: The authentication server performs authentication on accessing the resource provided by the first cloud service in response to the authentication request used for accessing the resource provided by the first cloud service, and returns an authentication success message to the first interface in a case that the authentication succeeds.

200c: The first interface transmits, in response to the authentication success message, the resource processing indication to the background server.

Operation 200c coincides with operation 201 in FIG. 3, and therefore operation 200c is not shown in FIG. 3.

For operation 200a, this embodiment of this application provides the following implementations:

In a specific implementation, the client may invoke the first interface of the first cloud service that needs to be processed, to transmit a resource processing request to the first interface, and the resource processing request carries the following information:

signature information of a user inputted by the client when the first interface is invoked; and information of the resource provided by the first cloud service and requested to be processed.

It can be understood that, the client or the background server in this embodiment of this application may transmit a related request to the interface by invoking the interface, and the two descriptions have the same meaning.

Further, the first interface generates an authentication request used for accessing the resource provided by the first cloud service in response to the resource processing request transmitted by the client and according to the signature information of the user that is inputted by the client when the first interface is invoked and that is carried in the resource processing request and the information about the resource provided by the first cloud service and requested to be processed. The authentication request carries the following information:

the signature information of the user inputted by the client when the first interface is invoked;

the information about the resource provided by the first cloud service and requested to be processed; and information about the first interface.

The information about the resource provided by the first cloud service and requested to be processed may include identification information of the resource provided by the first cloud service and requested to be processed and a specific processing manner requested to be performed on the resource. For example, the resource is a specified cloud virtual host provided by the first cloud service, and the specific processing manner is reading data from the cloud virtual host. Alternatively, for another example, the resource is a plurality of specified cloud virtual hosts provided by the first cloud service, and the specific processing manner is combining the plurality of cloud virtual hosts into a cluster.

For operation 200b, this embodiment of this application provides the following implementations:

In an implementation, the authentication server generates the signature information of the user in response to the authentication request transmitted by the first interface and used for accessing the resource provided by the first cloud service and according to the information, carried in the authentication request, about the resource provided by the first cloud service and requested to be processed, the information about the first interface and locally stored user information. Then, the authentication server compares self-generated signature information of the user with the signature information of the user carried in the authentication request, and in a case that a comparison result is that the two pieces of signature information are the same, it is determined that the authentication succeeds, which indicates that the client has an access right of the resource provided by the first cloud service, and the authentication server returns an authentication success message to the first interface. Conversely, in a case that a comparison result is that the two pieces of signature information are different, it is determined that the authentication fails, which indicates that the client does not have the access right of the resource provided by the first cloud service, and the authentication server returns an authentication failure message to the first interface.

For operation 200c, this embodiment of this application provides the following implementations:

In an implementation, the first interface transmits a resource processing indication to the background server in response to the authentication success message returned by the authentication server, so that the background server processes the resource provided by the first cloud service and requested by the client. The resource processing indication may carry the information about the resource provided by the first cloud service and requested to be processed, so that the background server performs specified processing on a specified resource according to the information.

In another implementation, the first interface returns an authentication failure indication to the client in response to the authentication failure message returned by the authentication server, and the client further reminds, according to the authentication failure indication, the user that the authentication fails. The current access process of the client to the resource provided by the first cloud service ends.

For operation 202, this embodiment of this application provides the following implementations:

In this embodiment of this application, for the time when the background server initiates the authentication request through the interface, the following two implementations are provided:

First, after receiving the resource processing indication from the first interface, the background server may first perform identification according to the resource processing indication, to determine the to-be-processed resource. In a case that the to-be-processed resource further includes a resource provided by another cloud service other than the resource provided by the first cloud service, an authentication request for accessing the resource provided by another cloud service may be first initiated to the authentication server through a corresponding interface, and only in a case that the background server obtains authentication success messages corresponding to all resources, the background server starts to perform resource processing.

That is, the background server may first obtain access rights of the resources before processing the resources.

Second, after receiving the resource processing indication from the first interface, the background server first processes the resource provided by the first cloud service. In a processing procedure, in a case that it is found that the to-be-processed resource does not belong to the first cloud service, and instead, belongs to the second cloud service, the background server may initiate, to the authentication server through a corresponding interface, an authentication request for the resource provided by the second cloud service. Only in a case that the background server obtains the authentication success message, the background server starts to process the resource provided by the second cloud service, and then after the resource provided by the second cloud service is processed, the background server may further continue to process the resource provided by the first cloud service, or initiate an authentication request for another cloud service.

That is, the background server may obtain, only when detecting that a resource provided by another cloud service needs to be accessed, an access right of the resource.

After the background server receives the resource processing indication from the first interface, in a case that the background server processes, according to the information, carried in the resource processing indication, about the resource provided by the first cloud service and requested to be processed, the resource provided by the first cloud service, the resource responds to the processing. In a case that another resource needs to be accessed, the background server may obtain a request, which is returned by the resource, that another resource needs to be accessed, and based on the request, the background server may determine the to-be-processed resource.

For example, the client requests to process a virtual private network provided by the first cloud service, and the background server needs to read specified data from the virtual private network. However, after responding to a data read request of the background server, the virtual private network finds that, to complete a data read task, security group information of a cloud virtual host needs to be obtained, and in a case that the security group information of the cloud virtual host is obtained, the cloud virtual host and a security group are involved. Therefore, the virtual private network returns information about the two resources to the background server, and the background server determines, according to the returned information, that the to-be-processed resource includes the cloud virtual host and the security group of the cloud virtual host.

Further, in an implementation, after determining the to-be-processed resource, the background server obtains a cloud service corresponding to each resource in the to-be-processed resource based on one or more resources included in the to-be-processed resource and according to a preset correspondence between a cloud service and a resource. Then, the background server determines whether the obtained cloud service includes the second cloud service, that is, whether the obtained cloud service includes another cloud service other than the first cloud service. In a case that the background server determines that the obtained cloud service includes the second cloud service, the background server determines that the to-be-processed resource includes the resource provided by the second cloud service, that is, the to-be-processed resource includes another resource other than the resource provided by the first cloud service, and then operation 203 is performed. Conversely, in a case that the background server determines that each obtained cloud service is the first cloud service, the background server determines that the to-be-processed resource does not include the resource provided by the second cloud service, that is, the to-be-processed resource only includes the resource provided by the first cloud service.

In this embodiment of this application, in a case that the to-be-processed resource only includes the resource provided by the first cloud service, the background server may continue to process the to-be-processed resource, and returns a processing result to the first interface until all processing on the to-be-processed resource is completed, so that the first interface returns the processing result to the client.

For operation 203, this embodiment of this application provides the following implementations:

In an implementation, the background server transmits a resource processing request to the second interface in a case that the background server determines that the to-be-processed resource includes the resource provided by the second cloud service. The resource processing request carries signature information of the first cloud service, and information about the resource included in the to-be-processed resource and provided by the second cloud service. The signature information of the first cloud service may be pre-configured in the background server, or may be temporarily generated by the background server as needed. This is not particularly limited in the embodiments of this application.

Further, the second interface initiates, to the authentication server according to the resource processing request transmitted by the background server, an authentication request used for accessing the resource provided by the second cloud service. The authentication request carries the signature information of the first cloud service, the information about the resource included in the to-be-processed resource and provided by the second cloud service, and information about the second interface. In an implementation, the second interface may extract information from the resource processing request, then generate the authentication request based on the extracted information and own information, and transmit the authentication request to the authentication server.

In a specific implementation, considering security between the background server and the second interface, the background server may invoke the second interface through an intranet interface.

It can be understood that, in this embodiment of this application, the resource processing request for the resource provided by the first cloud service is initiated by the client. However, in a procedure that the background server processes the resource provided by the first cloud service, in a case that the resource responds to the processing, the resource needs to access a resource provided by another cloud service, which is referred to as the resource provided by the second cloud service in this embodiment of this application. In this case, the background server initiates the resource processing request for the resource provided by the second cloud service instead of the client. In this case, a user of the resource provided by the second cloud service is equivalent to the first cloud service, and therefore, the first cloud service is not a common vendor (that is, the user, the common vendor is the user), and instead, is a super vendor. The super vendor has an access right of an interface and a resource corresponding to a self-provided cloud service, may give the access right of the interface and the resource corresponding to the self-provided cloud service to another cloud service provider, and may be given, by another cloud service provider, a right of accessing an interface and a resource provided by another cloud service provider, to implement right interworking between cloud services and right interworking between interfaces. Based on the foregoing, in a case that the background server initiates the resource processing request to the second interface, the resource processing request carries the signature information of the first cloud service. Correspondingly, in a case that the second interface initiates the authentication request to the authentication server, the authentication request also carries the signature information of the first cloud service, which is used for initiating an access request for the resource provided by the second cloud service. Correspondingly, the authentication server receives the signature information of the first cloud service, and performs, based on the signature information of the first cloud service, authentication on the access right of the first cloud service on the resource provided by the second cloud service.

For operation 204, this embodiment of this application provides the following implementations:

In an implementation, the authentication server generates the signature information of the user in response to the authentication request transmitted by the second interface and used for accessing the resource provided by the second cloud service and according to the information, carried in the authentication request, about the resource provided by the second cloud service and requested to be processed, the information about the second interface and locally stored information about the first cloud service. Then, the authentication server compares self-generated signature information of the user with the signature information of the user carried in the authentication request; and in a case that a comparison result is that the two pieces of signature information are the same, it is determined that the authentication succeeds, which indicates that the first cloud service has an access right of the resource provided by the second cloud service, and the authentication server returns an authentication success message to the second interface. Conversely, in a case that a comparison result is that the two pieces of signature information are different, it is determined that the authentication fails, which indicates that the first cloud service does not have the access right of the resource provided by the second cloud service, and the authentication server returns an authentication failure message to the second interface.

In a specific implementation, in a case that the authentication server generates the signature information, the authentication server may obtain the information about the first cloud service from preset policy information of the first cloud service, and obtain the signature information of the first cloud service based on the obtained information about the first cloud service.

For example, the policy information of the first cloud service may be shown in Table 1.

TABLE 1

| | |
|---|---|
| Authorizing person | Second cloud service |
| Authorized person | First cloud service |
| Interface available to be invoked | Cloud API (X) and cloud API (F) of the second cloud service |
| Resource available to be processed | All resources of some accounts (U1, U2 and U3) under the second cloud service in Beijing |
| Condition | None |
| Effect | Allowed |

For example, as shown in Table 1, the authorizing person is the second cloud service, that is, the resource provided by the second cloud service is accessed. The interface available to be accessed is an interface that can be invoked by the first cloud service and corresponds to the second cloud service, for example, the cloud API (X) and the cloud API (F) of the second cloud service. The cloud API (X) and the cloud API (F) may be all interfaces corresponding to the second cloud service, or may be some interfaces corresponding to the second cloud service. The resource available to be processed is a resource that is provided by the second cloud service and can be accessed by the first cloud service; the condition is a condition that needs to be met when the first cloud service accesses a specified resource provided by the second cloud service, for example, a processing time, a processing frequency, or the like of the resource; the effect is about whether a right of the authorized person for the interface available to be invoked and the resource available to be processed is effective. In a case that the effect is allowed, the authorized person is currently allowed to invoke an interface defined in the policy information and a corresponding resource. In a case that the effect is disallowed, the authorized person is currently not allowed to invoke the interface defined in the policy information and the corresponding resource.

If the first cloud service has the access right of the resource of the second cloud service, it is because the first cloud service is authorized in a pre-authorization phase of rights management, and after authorization, the authentication server may store the policy information of the first cloud service, which is later used for generating the signature information and performing the authentication. Conversely, if the first cloud service does not have the access right, it is because the first cloud service is not authorized in the pre-authorization phase of rights management, or there is not the resource provided by the second cloud service in authorized resources, or there is no interface used for transmitting the resource processing request in authorized interfaces, or the like. In this case, the signature information generated from the policy information, stored in the authentication server, of the first cloud service is not consistent with the received signature information of the first cloud service, and therefore the authentication fails.

In an implementation, an interface whitelist may be pre-configured in the authentication server, and in a case that the authentication server receives the authentication request transmitted by the second interface, the authentication server first determines, according to the information about the second interface carried in the authentication request, whether the second interface belongs to the interface whitelist. In a case that the second interface belongs to the interface whitelist, the authentication server may respond to the authentication request, and perform the foregoing authentication. Conversely, in a case that the second interface does not belong to the interface whitelist, the authentication server may not respond to the authentication request, or may return, to the second interface, a notification message indicating that the identity is invalid.

For operation 205, this embodiment of this application provides the following implementations:

In an implementation, the second interface transmits a resource processing indication to the background server in response to the authentication success message returned by the authentication server, so that the background server processes the requested resource provided by the second cloud service. The resource processing indication may carry the information about the resource provided by the second cloud service and requested to be processed, so that the background server performs specified processing on a specified resource according to the information.

In another implementation, the second interface returns an authentication failure indication to the client in response to the authentication failure message returned by the authentication server, and the client further reminds, according to the authentication failure indication, the user that the authentication fails. The current access process of the first cloud service to the resource provided by the second cloud service ends.

For operation 206, this embodiment of this application provides the following implementations:

In an implementation, the background server processes the to-be-processed resource in response to the resource processing indication from the second interface.

Because the second interface corresponds to the second cloud service, in a case that the resource processing indication is received from the second interface, the background server learns that the resource provided by the second cloud service can be processed. Therefore, in response to the resource processing indication, the background server may process the resource provided by the second cloud service, and after processing the resource provided by the second cloud service, continue to process the resource provided by the first cloud service.

For the transmitting, by the background server to the second interface, a resource processing request carrying signature information of the first cloud service, and information about the resource included in the to-be-processed resource and provided by the second cloud service, in a specific implementation, the background server may encrypt the information carried in the resource processing request by using a first encryption key, and transmit a resource processing request to the second interface, the resource processing request carrying information obtained after encryption.

Correspondingly, for the initiating, by the second interface to the authentication server, an authentication request carrying the signature information of the first cloud service, the information about the resource included in the to-be-processed resource and provided by the second cloud service, and information about the second interface, in a specific implementation, the second interface decrypts the information carried in the resource processing request by using a first decryption key, and encrypts information obtained after decryption by using a second encryption key in a case that decryption is successful, that is, encrypts the information about the second interface and the information obtained after decryption by using the second encryption key, and transmits an authentication request to the authentication server, the authentication request carrying the information obtained after encryption.

In this embodiment of this application, for information exchanged between the background server and the interfaces corresponding to the cloud services, basic security of the information may be ensured through encryption and decryption. A mutual trust mechanism may be pre-established between the background server and the interfaces, and the encryption keys and corresponding decryption keys are determined through the mutual trust mechanism. In this way, the information in the resource processing request transmitted by the background server to the second interface may be encrypted. Correspondingly, the second interface decrypts the information in the received resource processing request, and in a case that decryption is successful, it indicates that the mutual trust mechanism is established between two parties, and security of the information is partly ensured.

Correspondingly, for the performing, by the authentication server according to the information carried in the authentication request, authentication on accessing the resource provided by the second cloud service, in a specific implementation, the authentication server may decrypt, by using a second decryption key, the information in the authentication request transmitted by the second interface, and perform, based on the information obtained after decryption in a case that decryption is successful, authentication on accessing the resource provided by the second cloud service.

In this embodiment of this application, for information exchanged between the interfaces corresponding to the cloud services and the authentication server, basic security of the information may be ensured through encryption and decryption. A mutual trust mechanism may be pre-established between the interfaces and the authentication server, and the encryption keys and corresponding decryption keys are determined through the mutual trust mechanism. In this way, the information transmitted by the second interface to the authentication server may be encrypted. Correspondingly, the authentication server decrypts the information in the received authentication request, and in a case that decryption is successful, it indicates that the mutual trust mechanism is established between two parties, and security of the information is partly ensured.

In addition, in operation 200*a* to operation 200*c*, the foregoing mutual trust mechanism may be used for related information exchange between the first interface and the authentication server, and related information exchange between the first interface and the background server, and security of the information may be ensured through encryption and decryption during interaction. This is not described herein again.

Figure 4:
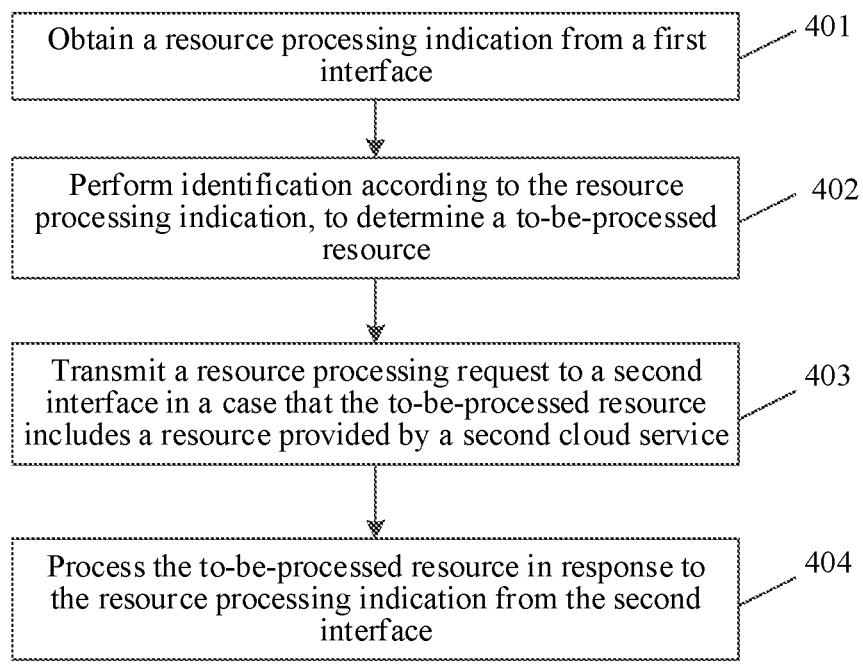
FIG. 4 is a schematic flowchart of a resource processing method on a background server side according to an embodiment of this application.

FIG. 4 is a schematic flowchart of a resource processing method on a background server side according to an embodiment of this application. As shown in FIG. 4, the method includes the following operations:

401: Obtain a resource processing indication from the first interface.

402: Perform identification according to the resource processing indication, to determine a to-be-processed resource.

For specific implementations of operation 402, refer to related descriptions of operation 202. Details are not described herein again.

403: Transmit a resource processing request to a second interface in a case that the to-be-processed resource includes a resource provided by a second cloud service.

For specific implementations of operation 403, refer to related descriptions of operation 203. Details are not described herein again.

404: Process the to-be-processed resource in response to the resource processing indication from the second interface.

For specific implementations of operation 404, refer to related descriptions of operation 206. Details are not described herein again.

Figure 5:
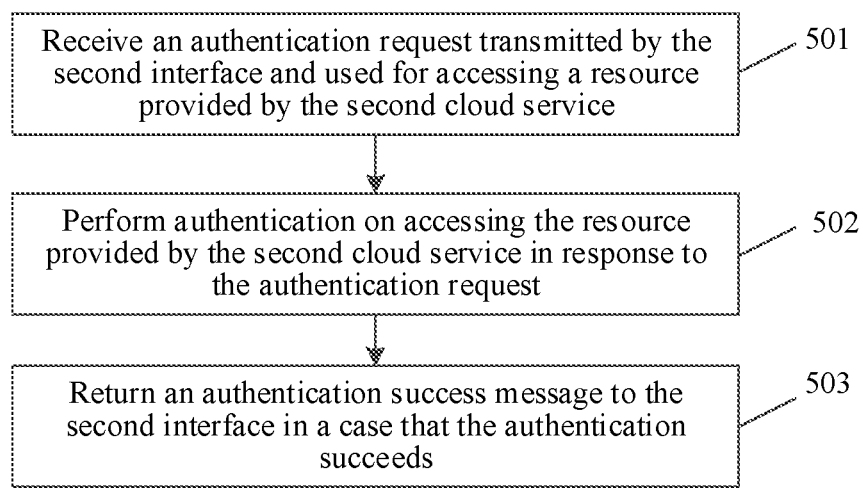
FIG. 5 is a schematic flowchart of a resource processing method on an authentication server side according to an embodiment of this application.

FIG. 5 is a schematic flowchart of a resource processing method on an authentication server side according to an embodiment of this application. As shown in FIG. 5, the method includes the following operations:

501: Receive an authentication request transmitted by the second interface and used for accessing a resource provided by the second cloud service.

For specific implementations of operation 501, refer to related descriptions of operation 204. Details are not described herein again.

502: Perform authentication on accessing the resource provided by the second cloud service in response to the authentication request.

For specific implementations of operation 502, refer to related descriptions of operation 204. Details are not described herein again.

503: Return an authentication success message to the second interface in a case that the authentication succeeds.

For specific implementations of operation 503, refer to related descriptions of operation 204. Details are not described herein again.

Figure 6:
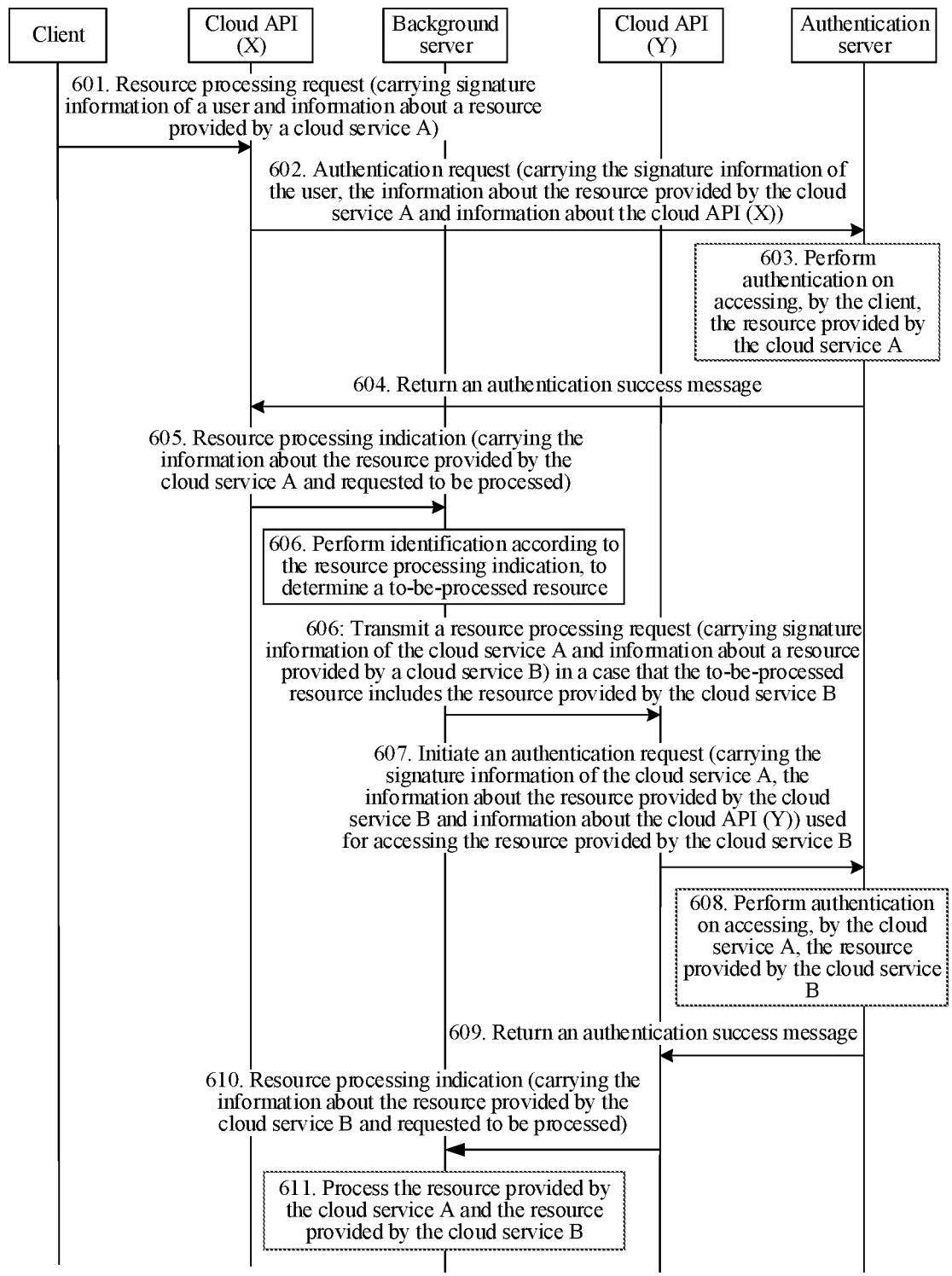
FIG. 6 is a schematic flowchart of an implementation of a resource processing method according to an embodiment of this application.

FIG. 6 is a schematic flowchart of an implementation of a resource processing method according to an embodiment of this application. In this embodiment, the resource processing method provided in this embodiment of this application is described by taking an example of a cloud service A, a cloud API (X) corresponding to the cloud service A, a cloud service B, and a cloud API (Y) corresponding to the cloud service B.

601: A client transmits a resource processing request to the cloud API (X) corresponding to the cloud service A, the resource processing request carrying signature information of a user and information about a resource provided by the cloud service A.

602: The cloud API (X) transmits, in response to the resource processing request transmitted by the client, an authentication request to an authentication server, the authentication request carrying the signature information of the user, the information about the resource provided by the cloud service A and information about the cloud API (X).

603: The authentication server performs, in response to the authentication request from the cloud API (X), authentication on accessing, by the client, the resource provided by the cloud service A, and performs operation 604 in a case that the authentication succeeds; and returns an authentication failure message to the cloud API (X) in a case that the authentication fails. This embodiment is described by taking an example that the authentication succeeds, and therefore a process that the authentication fails is not shown in FIG. 6.

The authentication server generates the signature information of the user according to the information, carried in the authentication request, about the resource provided by the cloud service A, the information about the cloud API (X) and locally stored user information. Then, the authentication server compares self-generated signature information of the user with the signature information of the user carried in the authentication request, and in a case that a comparison result is that the two pieces of signature information are the same, it is determined that the authentication succeeds, which indicates that the client has an access right of the resource provided by the cloud service A, and then operation 604 is performed. Conversely, in a case that a comparison result is that the two pieces of signature information are different, it is determined that the authentication fails, which indicates that the client does not have the access right of the resource provided by the cloud service A, and the authentication server returns an authentication failure message to the cloud API (X).

604: The authentication server returns an authentication success message to the cloud API (X).

605: The cloud API (X) transmits, in response to the authentication success message returned by the authentication server, a resource processing indication to the background server. The resource processing indication may carry the information about the resource provided by the cloud service A and requested to be processed.

606: The background server performs identification according to the resource processing indication in response to the resource processing indication, to determine a to-be-processed resource; and transmits a resource processing request to the cloud API (Y) corresponding to the cloud service B in a case that the to-be-processed resource further includes a resource provided by the cloud service B, the resource processing request carrying signature information of the cloud service A and information about the resource provided by the cloud service B.

607: The cloud API (Y) transmits, in response to the resource processing request from the background server, an authentication request to the authentication server, the authentication request carrying the signature information of the cloud service A, the information about the resource provided by the cloud service B and information about the cloud API (Y).

608: The authentication server performs, in response to the authentication request from the cloud API (X), authentication on accessing, by the cloud service A, the resource provided by the cloud service B, and performs operation 609 in a case that the authentication succeeds; and returns an authentication failure message to the cloud API (Y) in a case that the authentication fails. This embodiment is described by taking an example that the authentication succeeds, and therefore a process that the authentication fails is not shown in FIG. 6.

The authentication server generates the signature information of the cloud service A according to the information, carried in the authentication request, about the resource provided by the cloud service B, the information about the cloud API (Y) and locally stored authentication information of the cloud service A. Then, the authentication server compares self-generated signature information of the cloud service A with the signature information, carried in the authentication request, of the cloud service A, and in a case that a comparison result is that the two pieces of signature information are the same, it is determined that the authentication succeeds, which indicates that the cloud service A has an access right of the resource provided by the cloud service B, and then operation 609 is performed. Conversely, in a case that a comparison result is that the two pieces of signature information are different, it is determined that the authentication fails, which indicates that the cloud service A does not have the access right of the resource provided by the cloud service B, and the authentication server returns an authentication failure message to the cloud API (Y).

609: The authentication server returns an authentication success message to the cloud API (Y).

610: The cloud API (Y) transmits, in response to the authentication success message returned by the authentication server, a resource processing indication to the background server. The resource processing indication may carry the information about the resource provided by the cloud service B and requested to be processed.

611: The background server processes, in response to the resource processing indication, the resource provided by the cloud service A, then processes the resource provided by the cloud service B, and finally processes the resource provided by the cloud service A.

As mentioned above, a mutual trust mechanism needs to be pre-established both between the interfaces and the authentication server and between the interfaces and the background server, and the encryption keys and the decryption keys are determined through the mutual trust mechanism. In this embodiment of this application, since interaction between the interfaces and the authentication server and interaction between the interfaces and the background server belong to internal interaction, a lightweight mutual trust mechanism may be used, which may improve service performance on one hand, and ensure basic security on the other hand.

In this embodiment of this application, the foregoing related mutual trust mechanism may be established through the following aspects:

1. Identity authentication of the authentication server on the interface
2. Identity authentication of the interface on the authentication server
3. Identity authentication of the background server on the interface
4. Identity authentication of the interface on the background server The identity authentication related to the interface may be implemented by using a signature mechanism. A certificate is allocated to each interface and a cloud service corresponding to each interface, and in a case that the interface accesses the authentication server, the certificate needs to be added to a request and is used as information about the interface, such as the foregoing related information about the first interface or the second interface, that is, the authentication server is accessed by using the certificate as the information about the interface. The certificate of each interface and a cloud service corresponding to each interface may be allocated offline by a certificate server. In a case that the certificate is used for the foregoing resource processing method, the certificate may be encrypted and decrypted by using symmetric keys, or may be encrypted and decrypted by using asymmetric keys.

During identity authentication related to the background server and the authentication server, a certificate also needs to be allocated offline by the certificate server. In a case that the certificate is used for the foregoing resource processing method, the certificate may be encrypted and decrypted by using asymmetric keys, or may be encrypted and decrypted by using symmetric keys. A side accessing the server may store a public key, and the server may store a private key, so that a probability of being attacked may be reduced to some extent, and security of information exchanged may be ensured.

Figure 7:
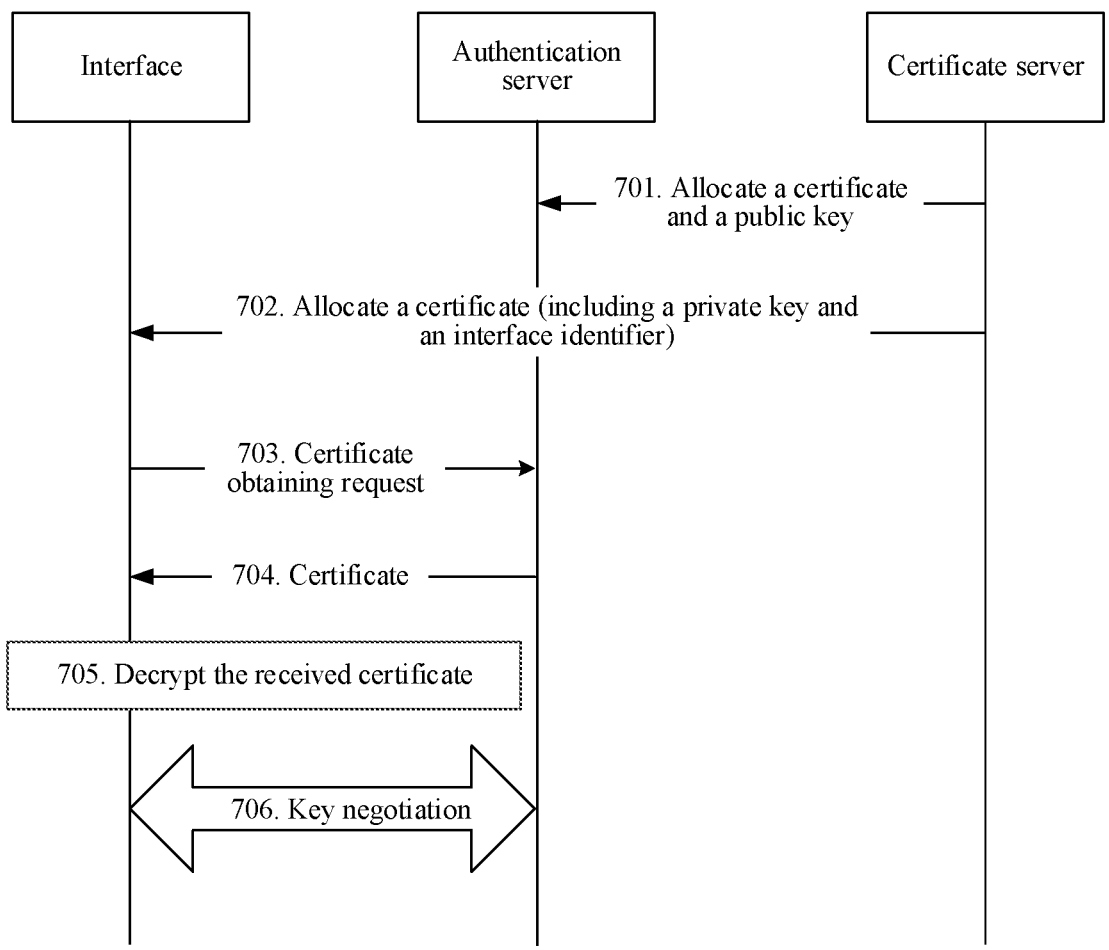
FIG. 7 is a schematic interaction flowchart of an identity authentication method between an interface and an authentication server according to an embodiment of this application.

FIG. 7 is a schematic interaction flowchart of an identity authentication method between an interface and an authentication server according to an embodiment of this application. As shown in FIG. 7, the method includes the following operations:

701: A certificate server allocates a certificate Pub_CA (Pub_Auth, Domain . . . ) and a public key to an authentication server, a corresponding private key being preset in the authentication server and the authentication server storing the certificate and the public key that are allocated.

702: The certificate server allocates a certificate to an interface, the certificate being formed by using an interface identifier (API ID) and a private key (API Secret).

Operation 701 and operation 702 belong to a phase that the certificate server allocates the certificates offline.

In this embodiment of this application, the public key and the private key related in a case that the certificates are allocated may be symmetric keys, or may be asymmetric keys. Whether the symmetric keys or the asymmetric keys are used may be determined according to different application scenarios. For example, for a service scenario with a relatively high performance requirement and a moderate security requirement, the symmetric keys may be used, and for a service scenario with a moderate performance requirement, the asymmetric keys may be used. This is not particularly limited in the embodiments of this application.

703: The interface transmits a certificate obtaining request to the authentication server.

704: The authentication server encrypts, by using the public key in response to the certificate obtaining request, the certificate previously allocated by the certificate server, and then returns the encrypted certificate to the interface through a certificate obtaining response.

705: The interface decrypts the received certificate by using the private key previously provided by the certificate server, and performs operation 706 in a case that decryption is successful and identity authentication of both the interface and the authentication server succeeds.

In a case that the interface decrypts the certificate successfully by using the private key, it indicates that the private key and the public key for encrypting the certificate are a pair of an encryption key and a decryption key matching each other. Therefore, both the identity of the authentication server and the identity of the interface are proved, and identity authentication of the two parties succeeds.

706: Perform negotiation of the encryption key and the decryption key between the interface and the authentication server, the interface owning the encryption key and the authentication server owning the decryption key after the negotiation, the encryption key and the decryption key being used for encrypting and decrypting information carried in an authentication request initiated by the interface, to ensure security of communication.

Operation 703 to operation 706 belong to a key negotiation phase between the interface and the authentication server, and operation 703 to operation 706 need to be performed before the interface interacts with the authentication server, to complete key negotiation. In this way, when the interface and the authentication server need to interact with each other, the encryption key and the decryption key may be directly used, which improves interaction efficiency between the interface and the authentication server and execution performance of the interface. In addition, operation 703 to operation 706 may be alternatively performed periodically. In this way, the key negotiation may be performed periodically between the interface and the authentication server, to update the encryption key and the decryption key, which further improves security of information exchange.

The foregoing related interfaces are interfaces, corresponding to the cloud services, in the interface device, for example, the first interface and the second interface, that is, all the interfaces in the interface device implement identity authentication between the interfaces and the authentication server based on the foregoing method.

Figure 8:
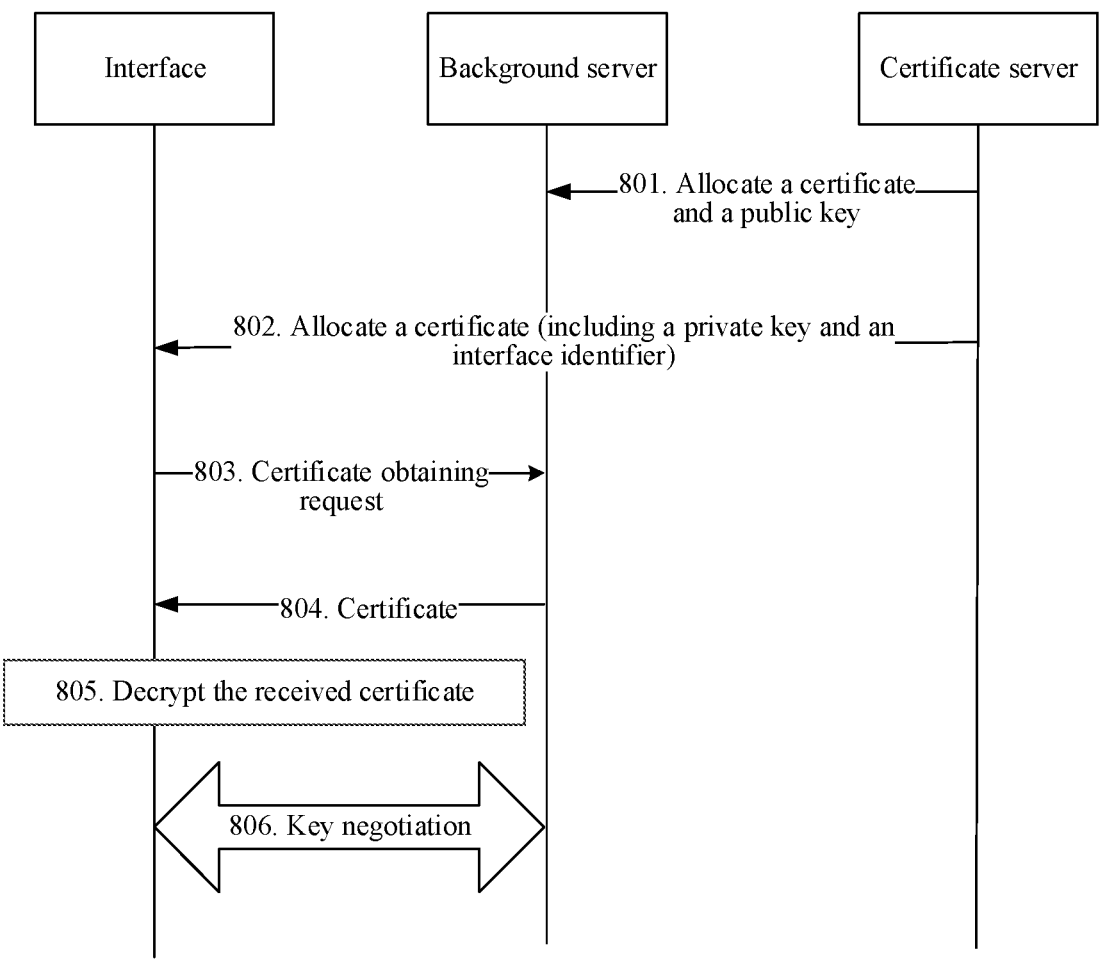
FIG. 8 is a schematic interaction flowchart of an identity authentication method between an interface and a background server according to an embodiment of this application.

FIG. 8 is a schematic interaction flowchart of an identity authentication method between an interface and a background server according to an embodiment of this application. As shown in FIG. 8, the method includes the following operations:

801: A certificate server allocates a certificate Pub_CA1 (Pub_Auth1, Domain . . . ) and a public key to a background server, a corresponding private key being preset in an authentication server and the background server storing the certificate and the public key that are allocated.

802: The certificate server allocates a certificate to an interface, the certificate being formed by using an interface identifier (API ID) and a private key (API Secret).

Operation 801 and operation 802 belong to a phase that the certificate server allocates the certificates offline.

803: The interface transmits a certificate obtaining request to the background server.

804: The background server encrypts, by using the public key in response to the certificate obtaining request, the certificate previously allocated by the certificate server, and then returns the encrypted certificate to the interface through a certificate obtaining response.

805: The interface decrypts the received certificate by using the private key previously provided by the certificate server, and performs operation 806 in a case that decryption is successful and identity authentication of both the interface and the background server succeeds.

In a case that the interface decrypts the certificate successfully by using the private key, it indicates that the private key and the public key for encrypting the certificate are a pair of an encryption key and a decryption key matching each other. Therefore, both the identity of the background server and the identity of the interface are proved, and identity authentication of the two parties succeeds.

806: Perform negotiation of the encryption key and the decryption key between the interface and the background server, the interface owning the encryption key and the background server owning the decryption key after the negotiation, the encryption key and the decryption key being used for encrypting and decrypting information carried in an authentication request initiated by the interface, to ensure security of communication.

Operation 803 to operation 806 belong to a key negotiation phase between the interface and the background server, and operation 803 to operation 806 need to be performed before the interface interacts with the background server, to complete key negotiation. In this way, when the interface and the background server need to interact with each other, the encryption key and the decryption key may be directly used, which improves interaction efficiency between the interface and the background server and execution performance of the interface. In addition, operation 803 to operation 806 may be further performed periodically. In this way, the key negotiation may be performed periodically between the interface and the background server, to update the encryption key and the decryption key, which further improves security of information exchange.

The foregoing related interfaces are interfaces, corresponding to the cloud services, in the interface device, for example, the first interface device and the second interface, that is, all the interfaces in the interface device implement identity authentication between the interfaces and the background server based on the foregoing method.

An embodiment of this application further provides apparatus embodiments for implementing the operations and the methods in the foregoing method embodiments.

Figure 9:
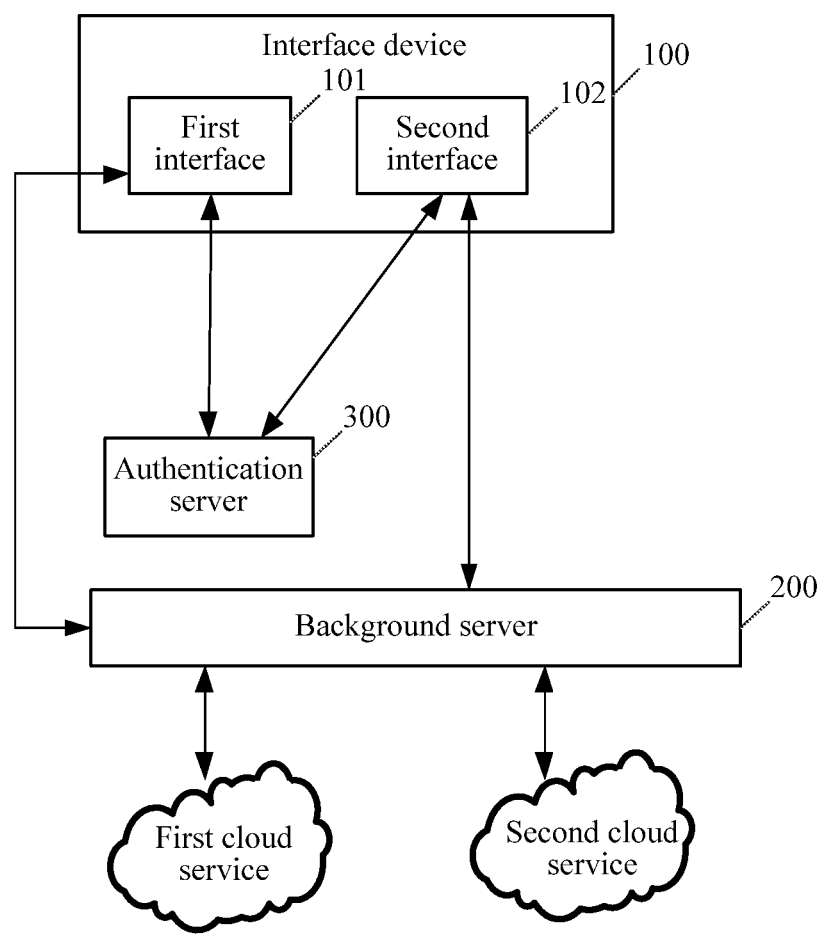
FIG. 9 is a schematic structural diagram of a resource processing system according to an embodiment of this application.

FIG. 9 is a schematic structural diagram of a resource processing system according to an embodiment of this application. As shown in FIG. 9, the system includes an interface device 100, a background server 200 and an authentication server 300, the interface device 100 being at least configured with a first interface 101 and a second interface 102, the first interface 101 corresponding to a first cloud service, and the second interface 102 corresponding to a second cloud service.

The background server 200 is configured to obtain a resource processing indication from the first interface 101.

The background server 200 is further configured to perform identification according to the resource processing indication, to determine a to-be-processed resource.

The background server 200 is further configured to transmit a resource processing request to the second interface 102 in a case that the to-be-processed resource includes a resource provided by the second cloud service.

The second interface 102 is configured to initiate, to the authentication server 300 according to the resource processing request, an authentication request used for accessing the resource provided by the second cloud service.

The authentication server 300 is configured to perform authentication on accessing the resource provided by the second cloud service in response to the authentication request, and return an authentication success message to the second interface 102 in a case that the authentication succeeds.

The second interface 102 is further configured to transmit a resource processing indication to the background server 200 in response to the authentication success message.

The background server 200 is further configured to process the to-be-processed resource in response to the resource processing indication from the second interface.

The units in this embodiment can perform the method shown in FIG. 2. Therefore, for a part that is not described in detail in this embodiment, refer to the related description of FIG. 2.

Figure 10:
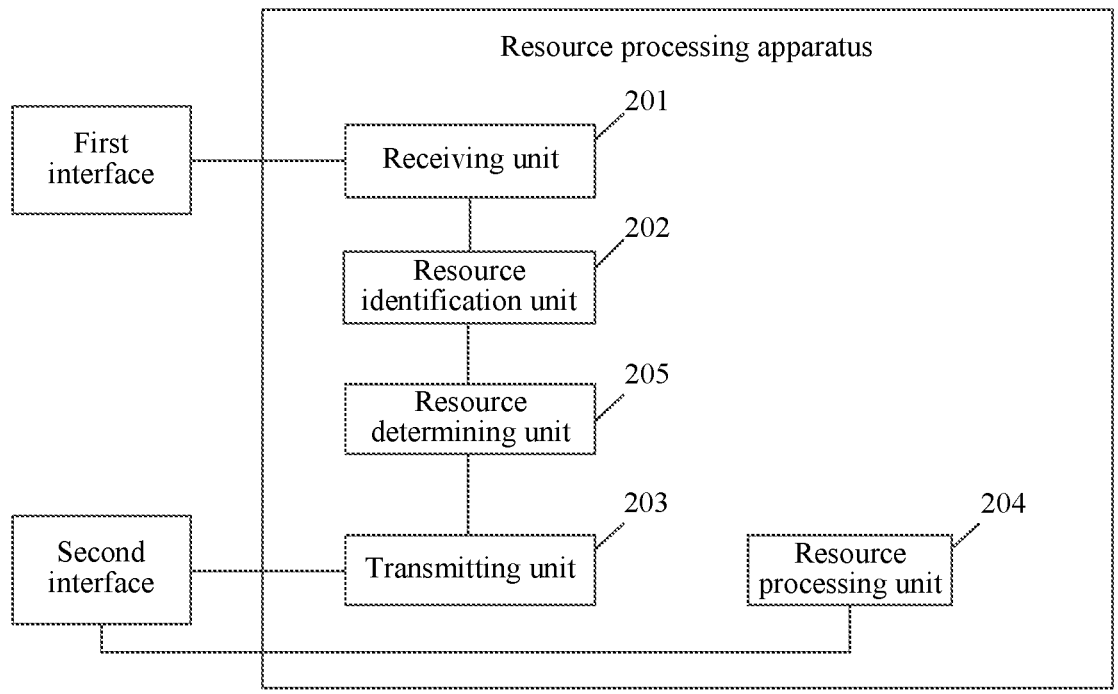
FIG. 10 is a functional block diagram of a resource processing apparatus in a background server according to an embodiment of this application.

FIG. 10 is a functional block diagram of a resource processing apparatus according to an embodiment of this application. The resource processing apparatus is applied to a system including an interface device, a background server and an authentication server. In the system, the interface device is at least configured with a first interface and a second interface, the first interface corresponds to a first cloud service, and the second interface corresponds to a second cloud service; and the apparatus is located in the background server. As shown in FIG. 10, the apparatus includes:

a receiving unit 201, configured to obtain a resource processing indication from the first interface;

a resource identification unit 202, configured to perform identification according to the resource processing indication, to determine a to-be-processed resource;

a transmitting unit 203, configured to transmit a resource processing request to the second interface in a case that the to-be-processed resource includes a resource provided by the second cloud service; and a resource processing unit 204, configured to process the to-be-processed resource in response to the resource processing indication from the second interface.

The apparatus further includes:

a resource determining unit 205, configured to obtain a cloud service corresponding to each resource in the to-be-processed resource according to a preset correspondence between a cloud service and a resource; determine whether the obtained cloud service includes the second cloud service; and determine that the to-be-processed resource includes the resource provided by the second cloud service in a case that it is determined that the obtained cloud service includes the second cloud service.

Figure 11:
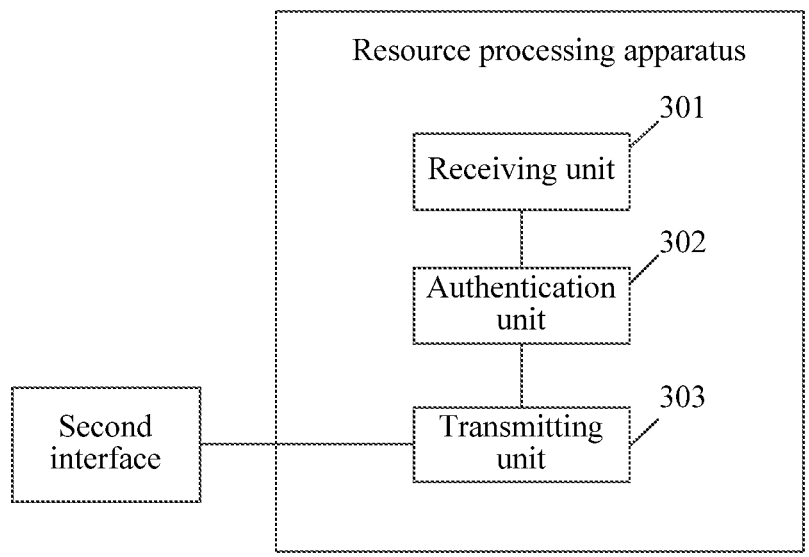
FIG. 11 is another functional block diagram of a resource processing apparatus in an authentication server according to an embodiment of this application.

FIG. 11 is another functional block diagram of a resource processing apparatus according to an embodiment of this application. The resource processing apparatus is applied to a system including an interface device, a background server and an authentication server. In the system, the interface device is at least configured with a first interface and a second interface, the first interface corresponds to a first cloud service, and the second interface corresponds to a second cloud service; and the apparatus is located in the authentication server. As shown in FIG. 11, the apparatus includes:

a receiving unit 301, configured to receive an authentication request transmitted by the second interface and used for accessing a resource provided by the second cloud service;

an authentication unit 302, configured to perform authentication on accessing the resource provided by the second cloud service in response to the authentication request; and a transmitting unit 303, configured to return an authentication success message to the second interface in a case that the authentication succeeds.

Figure 12:
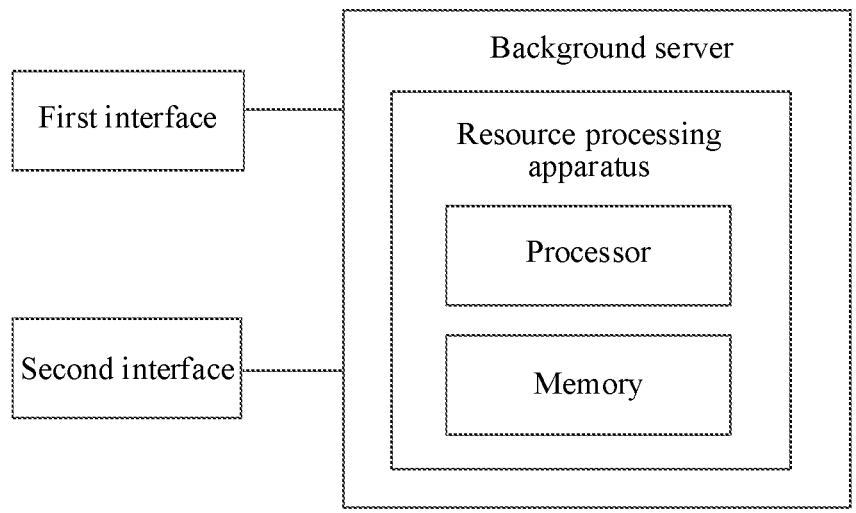
FIG. 12 is a hardware architecture diagram of a resource processing apparatus in a background server according to an embodiment of this application.

FIG. 12 is a hardware architecture diagram of a resource processing apparatus according to an embodiment of this application. The resource processing apparatus is applied to a system including an interface device, a background server and an authentication server. In the system, the interface device is at least configured with a first interface and a second interface, the first interface corresponds to a first cloud service, and the second interface corresponds to a second cloud service; and the apparatus is located in the background server. As shown in FIG. 12, the apparatus includes a processor and a memory. The memory stores an instruction that can be executed by the processor, and the processor is configured to perform the resource processing method applied to the background server side shown in FIG. 4 in a case that the instruction is executed. This is not described herein again.

Figure 13:
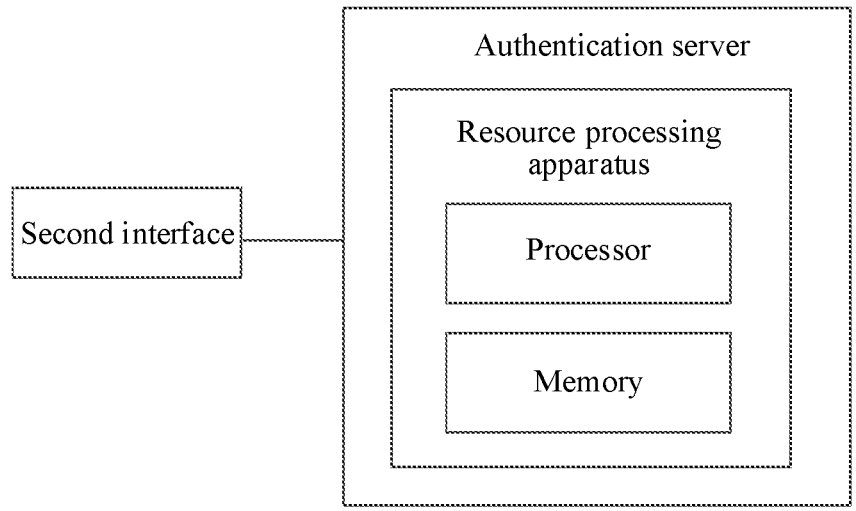
FIG. 13 is a hardware architecture diagram of a resource processing apparatus in an authentication server according to an embodiment of this application.

FIG. 13 is a hardware architecture diagram of a resource processing apparatus according to an embodiment of this application. The resource processing apparatus is applied to a system including an interface device, a background server and an authentication server. In the system, the interface device is at least configured with a first interface and a second interface, the first interface corresponds to a first cloud service, and the second interface corresponds to a second cloud service; and the apparatus is located in the authentication server. As shown in FIG. 13, the apparatus includes a processor and a memory. The memory stores an instruction that can be executed by the processor, and the processor is configured to perform the resource processing method applied to the authentication server side shown in FIG. 5 in a case that the instruction is executed. This is not described herein again.

An embodiment of this application further provides a computer-readable medium, including a computer-executable instruction, and when the computer-executable instruction is run, the following operations are performed:

obtaining a resource processing indication from the first interface;

performing identification according to the resource processing indication, to determine a to-be-processed resource;

transmitting a resource processing request to the second interface in a case that the to-be-processed resource includes a resource provided by the second cloud service; and processing the to-be-processed resource in response to the resource processing indication from the second interface.

An embodiment of this application further provides a computer-readable medium, including a computer-executable instruction, and when the computer-executable instruction is run, the following operations are performed:

receiving an authentication request transmitted by the second interface and used for accessing a resource provided by the second cloud service;

performing authentication on accessing the resource provided by the second cloud service in response to the authentication request; and returning an authentication success message to the second interface in a case that the authentication succeeds.

The technical solutions of the embodiments of this application have the following beneficial effects:

In the embodiments of this application, in a procedure that the background server processes a resource provided by a first cloud service, in a case that a resource provided by a second cloud service needs to be accessed, the background server initiates a resource processing request to a second interface corresponding to the second cloud service, to trigger the second interface to initiate, to an authentication server, authentication on accessing, by the first cloud service, the resource provided by the second cloud service, and in a case that the authentication succeeds, the background server is triggered through the second interface corresponding to the second cloud service to perform resource processing. Compared with the related art, in a procedure of processing the resource, in a case that a resource provided by another cloud service needs to be accessed, the background server initiates a resource processing request to an interface corresponding to the another cloud service instead, to trigger the authentication server to perform authentication, which prevents a plurality sets of invocation logic from being configured on the user side. The user side does not need to provide information for the authentication. Therefore, design complexity and maintenance costs of the client on the user side are reduced. In addition, in the procedure of processing the resource, the background server may find, through identification, that the resource provided by the other cloud service needs to be accessed. Therefore, the background server may directly initiate a resource processing request, to avoid a case in which the background server interacts with the client to cause the client to initiate the resource processing request, thereby improving resource processing efficiency.

On the other hand, a lightweight mutual trust mechanism is further added to the embodiments of this application. Identity authentication may be performed between the interface and the authentication server, and between the interface and the background server, and exchanged information is encrypted based on a key on which negotiation is performed after the identity authentication, which further ensures security and traceability to some extent while ensuring the processing efficiency.

It may be clearly understood by a person skilled in the art that for convenience and brevity of description, for a detailed working process of the foregoing system, apparatus, and unit, refer to a corresponding process in the foregoing method embodiments, and details are not described herein again.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer apparatus (which may be a personal computer, a server, or a network apparatus) or a processor to perform some operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A resource processing method, applied to a computer system comprising an interface device, a background server and an authentication server; in the computer system, the interface device being configured with at least a first interface and a second interface, the first interface corresponding to a first cloud service, and the second interface corresponding to a second cloud service; and the method comprising:
   obtaining, by the background server, a resource processing indication from the first interface;
   performing, by the background server, identification according to the resource processing indication, to determine a to-be-processed resource;
   transmitting, by the background server, a resource processing request to the second interface in a case that the to-be-processed resource comprises a resource provided by the second cloud service;
   initiating, by the second interface according to the resource processing request, an authentication request to the authentication server for accessing the resource provided by the second cloud service;
   performing, by the authentication server in response to the authentication request, authentication on accessing the resource provided by the second cloud service, and returning, by the authentication server an authentication success message to the second interface in a case that the authentication succeeds;
   transmitting, by the second interface in response to the authentication success message, a resource processing indication to the background server; and
   processing, by the background server, the to-be-processed resource in response to the resource processing indication from the second interface.

2. The method according to claim 1, the method further comprising:
   before obtaining, by the background server, a resource processing indication from the first interface:
   initiating, by the first interface to the authentication server in response to a resource processing request transmitted by a client, an authentication request used for accessing a resource provided by the first cloud service;
   performing, by the authentication server in response to the authentication request used for accessing the resource provided by the first cloud service, authentication on accessing the resource provided by the first cloud service, and returning an authentication success message to the first interface in a case that the authentication succeeds; and
   transmitting, by the first interface in response to the authentication success message, the resource processing indication to the background server.

3. The method according to claim 1, wherein:
   the transmitting, by the background server, a resource processing request to the second interface comprises: transmitting, by the background server to the second interface, a resource processing request carrying signature information of the first cloud service, and information about the resource comprised in the to-be-processed resource and provided by the second cloud service;
   the initiating, by the second interface to the authentication server according to the resource processing request, an authentication request used for accessing the resource provided by the second cloud service comprises: initiating, by the second interface to the authentication server, an authentication request carrying the signature information of the first cloud service, the information about the resource comprised in the to-be-processed resource and provided by the second cloud service, and information about the second interface; and
   the performing, by the authentication server in response to the authentication request, authentication on accessing the resource provided by the second cloud service comprises: performing, by the authentication server according to the information carried in the authentication request, authentication on accessing the resource provided by the second cloud service.

4. The method according to claim 3, wherein:
   the transmitting, by the background server to the second interface, a resource processing request carrying signature information of the first cloud service, and information about the resource comprised in the to-be-processed resource and provided by the second cloud service comprises: encrypting, by the background server, the information carried in the resource processing request by using a first encryption key, and transmitting a resource processing request to the second interface, the resource processing request carrying information obtained after encryption;
   the initiating, by the second interface to the authentication server, an authentication request carrying the signature information of the first cloud service, the information about the resource comprised in the to-be-processed resource and provided by the second cloud service, and information about the second interface comprises: decrypting, by the second interface, the information carried in the resource processing request by using a first decryption key, and encrypting information obtained after decryption by using a second encryption key in a case that decryption is successful, and transmitting an authentication request to the authentication server, the authentication request carrying the information obtained after encryption; and the performing, by the authentication server according to the information carried in the authentication request, authentication on accessing the resource provided by the second cloud service comprises: decrypting, by the authentication server by using a second decryption key, the information in the authentication request transmitted by the second interface, and performing, based on the information obtained after decryption in a case that decryption is successful, authentication on accessing the resource provided by the second cloud service.

5. The method according to claim 1, the method further comprising:
before transmitting a resource processing request to the second interface in a case that the to-be-processed resource comprises a resource provided by the second cloud service:
obtaining a cloud service corresponding to each resource in the to-be-processed resource according to a preset correspondence between a cloud service and a resource;
determining whether the obtained cloud service comprises the second cloud service; and
determining that the to-be-processed resource comprises the resource provided by the second cloud service in a case that it is determined that the obtained cloud service comprises the second cloud service.

6. A resource processing computer system, comprising an interface device, a background server and an authentication server, the interface device being configured with at least a first interface and a second interface, the first interface corresponding to a first cloud service, and the second interface corresponding to a second cloud service, each having one or more processors, memory coupled to the one or more processors and a plurality of programs stored in the memory that, when executed by the one or more processors, cause the resource processing computer system to perform a plurality of operations comprising:
obtaining, by the background server, a resource processing indication from the first interface;
performing, by the background server, identification according to the resource processing indication, to determine a to-be-processed resource;
transmitting, by the background server, a resource processing request to the second interface in a case that the to-be-processed resource comprises a resource provided by the second cloud service;
initiating, by the second interface according to the resource processing request, an authentication request to the authentication server for accessing the resource provided by the second cloud service;
performing, by the authentication server in response to the authentication request, authentication on accessing the resource provided by the second cloud service, and returning, by the authentication server an authentication success message to the second interface in a case that the authentication succeeds;
transmitting, by the second interface in response to the authentication success message, a resource processing indication to the background server; and
processing, by the background server, the to-be-processed resource in response to the resource processing indication from the second interface.

7. The resource processing computer system according to claim 6, wherein the plurality of operations further comprise:

before obtaining, by the background server, a resource processing indication from the first interface:
initiating, by the first interface to the authentication server in response to a resource processing request transmitted by a client, an authentication request used for accessing a resource provided by the first cloud service;
performing, by the authentication server in response to the authentication request used for accessing the resource provided by the first cloud service, authentication on accessing the resource provided by the first cloud service, and returning an authentication success message to the first interface in a case that the authentication succeeds; and
transmitting, by the first interface in response to the authentication success message, the resource processing indication to the background server.

8. The resource processing computer system according to claim 6, wherein:
the transmitting, by the background server, a resource processing request to the second interface comprises: transmitting, by the background server to the second interface, a resource processing request carrying signature information of the first cloud service, and information about the resource comprised in the to-be-processed resource and provided by the second cloud service;
the initiating, by the second interface to the authentication server according to the resource processing request, an authentication request used for accessing the resource provided by the second cloud service comprises: initiating, by the second interface to the authentication server, an authentication request carrying the signature information of the first cloud service, the information about the resource comprised in the to-be-processed resource and provided by the second cloud service, and information about the second interface; and
the performing, by the authentication server in response to the authentication request, authentication on accessing the resource provided by the second cloud service comprises: performing, by the authentication server according to the information carried in the authentication request, authentication on accessing the resource provided by the second cloud service.

9. The resource processing computer system according to claim 8, wherein:
the transmitting, by the background server to the second interface, a resource processing request carrying signature information of the first cloud service, and information about the resource comprised in the to-be-processed resource and provided by the second cloud service comprises: encrypting, by the background server, the information carried in the resource processing request by using a first encryption key, and transmitting a resource processing request to the second interface, the resource processing request carrying information obtained after encryption;
the initiating, by the second interface to the authentication server, an authentication request carrying the signature information of the first cloud service, the information about the resource comprised in the to-be-processed resource and provided by the second cloud service, and information about the second interface comprises: decrypting, by the second interface, the information carried in the resource processing request by using a first decryption key, and encrypting information obtained after decryption by using a second encryption key in a case that decryption is successful, and transmitting an authentication request to the authentication server, the authentication request carrying the information obtained after encryption; and the performing, by the authentication server according to the information carried in the authentication request, authentication on accessing the resource provided by the second cloud service comprises: decrypting, by the authentication server by using a second decryption key, the information in the authentication request transmitted by the second interface, and performing, based on the information obtained after decryption in a case that decryption is successful, authentication on accessing the resource provided by the second cloud service.

10. The resource processing computer system according to claim 6, wherein the plurality of operations further comprise:

before transmitting a resource processing request to the second interface in a case that the to-be-processed resource comprises a resource provided by the second cloud service:

obtaining a cloud service corresponding to each resource in the to-be-processed resource according to a preset correspondence between a cloud service and a resource;

determining whether the obtained cloud service comprises the second cloud service; and determining that the to-be-processed resource comprises the resource provided by the second cloud service in a case that it is determined that the obtained cloud service comprises the second cloud service.

11. A non-transitory computer readable storage medium storing a plurality of machine readable instructions in connection with a resource processing computer system, comprising an interface device, a background server and an authentication server, each having one or more processors, the interface device being configured with at least a first interface and a second interface, the first interface corresponding to a first cloud service, and the second interface corresponding to a second cloud service, when executed by the one or more processors, cause the resource processing computer system to perform a plurality of operations comprising:

obtaining, by the background server, a resource processing indication from the first interface;

performing, by the background server, identification according to the resource processing indication, to determine a to-be-processed resource;

transmitting, by the background server, a resource processing request to the second interface in a case that the to-be-processed resource comprises a resource provided by the second cloud service;

initiating, by the second interface according to the resource processing request, an authentication request to the authentication server for accessing the resource provided by the second cloud service;

performing, by the authentication server in response to the authentication request, authentication on accessing the resource provided by the second cloud service, and returning, by the authentication server an authentication success message to the second interface in a case that the authentication succeeds;

transmitting, by the second interface in response to the authentication success message, a resource processing indication to the background server; and processing, by the background server, the to-be-processed resource in response to the resource processing indication from the second interface.

12. The non-transitory computer readable storage medium according to claim 11, wherein the plurality of operations further comprise:

before obtaining, by the background server, a resource processing indication from the first interface:

initiating, by the first interface to the authentication server in response to a resource processing request transmitted by a client, an authentication request used for accessing a resource provided by the first cloud service;

performing, by the authentication server in response to the authentication request used for accessing the resource provided by the first cloud service, authentication on accessing the resource provided by the first cloud service, and returning an authentication success message to the first interface in a case that the authentication succeeds; and transmitting, by the first interface in response to the authentication success message, the resource processing indication to the background server.

13. The non-transitory computer readable storage medium according to claim 11, wherein:

the transmitting, by the background server, a resource processing request to the second interface comprises: transmitting, by the background server to the second interface, a resource processing request carrying signature information of the first cloud service, and information about the resource comprised in the to-be-processed resource and provided by the second cloud service;

the initiating, by the second interface to the authentication server according to the resource processing request, an authentication request used for accessing the resource provided by the second cloud service comprises: initiating, by the second interface to the authentication server, an authentication request carrying the signature information of the first cloud service, the information about the resource comprised in the to-be-processed resource and provided by the second cloud service, and information about the second interface; and the performing, by the authentication server in response to the authentication request, authentication on accessing the resource provided by the second cloud service comprises: performing, by the authentication server according to the information carried in the authentication request, authentication on accessing the resource provided by the second cloud service.

14. The non-transitory computer readable storage medium according to claim 13, wherein:

the transmitting, by the background server to the second interface, a resource processing request carrying signature information of the first cloud service, and information about the resource comprised in the to-be-processed resource and provided by the second cloud service comprises: encrypting, by the background server, the information carried in the resource processing request by using a first encryption key, and transmitting a resource processing request to the second interface, the resource processing request carrying information obtained after encryption;

the initiating, by the second interface to the authentication server, an authentication request carrying the signature information of the first cloud service, the information about the resource comprised in the to-be-processed resource and provided by the second cloud service, and information about the second interface comprises: decrypting, by the second interface, the information carried in the resource processing request by using a first decryption key, and encrypting information obtained after decryption by using a second encryption key in a case that decryption is successful, and transmitting an authentication request to the authentication server, the authentication request carrying the information obtained after encryption; and the performing, by the authentication server according to the information carried in the authentication request, authentication on accessing the resource provided by the second cloud service comprises: decrypting, by the authentication server by using a second decryption key, the information in the authentication request transmitted by the second interface, and performing, based on the information obtained after decryption in a case that decryption is successful, authentication on accessing the resource provided by the second cloud service.

15. The non-transitory computer readable storage medium according to claim 11, wherein the plurality of operations further comprise:

before transmitting a resource processing request to the second interface in a case that the to-be-processed resource comprises a resource provided by the second cloud service:

obtaining a cloud service corresponding to each resource in the to-be-processed resource according to a preset correspondence between a cloud service and a resource;

determining whether the obtained cloud service comprises the second cloud service; and determining that the to-be-processed resource comprises the resource provided by the second cloud service in a case that it is determined that the obtained cloud service comprises the second cloud service.

* * * * *